US 11,106,901 B2

(12) United States Patent
He et al.

(10) Patent No.: US 11,106,901 B2
(45) Date of Patent: Aug. 31, 2021

(54) METHOD AND SYSTEM FOR RECOGNIZING USER ACTIONS WITH RESPECT TO OBJECTS

(71) Applicant: ALIBABA GROUP HOLDING LIMITED, Grand Cayman (KY)

(72) Inventors: Hualin He, Hangzhou (CN); Chunxiang Pan, Hangzhou (CN); Yabo Ni, Hangzhou (CN); Anxiang Zeng, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 76 days.

(21) Appl. No.: 16/713,479

(22) Filed: Dec. 13, 2019

(65) Prior Publication Data
US 2020/0193148 A1 Jun. 18, 2020

(30) Foreign Application Priority Data

Dec. 14, 2018 (CN) .......................... 201811533006.X

(51) Int. Cl.
*G06K 9/00* (2006.01)
*G06F 3/01* (2006.01)
*G06F 3/03* (2006.01)

(52) U.S. Cl.
CPC ......... *G06K 9/00335* (2013.01); *G06F 3/017* (2013.01); *G06F 3/0304* (2013.01); *G06K 9/00375* (2013.01); *G06T 2207/10016* (2013.01)

(58) Field of Classification Search
CPC ............ G06K 9/00335; G06K 9/00375; G06F 3/017; G06F 3/0304

USPC ........................................................ 382/103
See application file for complete search history.

(56) References Cited

U.S. PATENT DOCUMENTS

| 6,014,461 | A  | 1/2000 | Hennessey et al. |
| 7,495,561 | B2 | 2/2009 | Bodin et al. |
| 7,504,949 | B1 | 3/2009 | Rouaix et al. |
| 7,757,947 | B2 | 7/2010 | Reznik et al. |
| 7,865,398 | B2 | 1/2011 | Schon |
| 8,175,925 | B1 | 5/2012 | Rouaix |

(Continued)

FOREIGN PATENT DOCUMENTS

| CN | 101149792 B | 6/2010 |
| JP | 2009505923 A | 2/2009 |

OTHER PUBLICATIONS

International Search Report and Written Opinion of the International Searching Authority for International Application No. PCT/US2019/066197, dated Mar. 3, 2020, 9 pages.

(Continued)

*Primary Examiner* — Stephen P Coleman

(57) ABSTRACT

The specification discloses a computer-implemented method for user action determination, comprising: recognizing an item displacement action performed by a user; determining a first time and a first location of the item displacement action; recognizing a target item in a non-stationary state; determining a second time when the target item is in the non-stationary state and a second location where the target item is in the non-stationary state; and in response to determining that the first time matches the second time and the first location matches the second location, determining that the item displacement action of the user is performed with respect to the target item.

20 Claims, 8 Drawing Sheets

(56) References Cited

U.S. PATENT DOCUMENTS

| | | |
|---|---|---|
| 8,493,442 B2 | 7/2013 | Fernandez et al. |
| 9,049,259 B2 | 6/2015 | Rathod |
| 10,001,402 B1 | 6/2018 | Gyori et al. |
| 10,176,677 B2 | 1/2019 | Herring et al. |
| 10,239,738 B2 | 3/2019 | High et al. |
| 10,242,393 B1 | 3/2019 | Kumar et al. |
| 10,268,983 B2 | 4/2019 | Kumar et al. |
| 2002/0126161 A1 | 9/2002 | Kuzunuki et al. |
| 2007/0046464 A1 | 3/2007 | Onderko et al. |
| 2008/0077511 A1 | 3/2008 | Zimmerman |
| 2010/0027845 A1 | 2/2010 | Kim et al. |
| 2014/0368436 A1 | 12/2014 | Abzarian et al. |
| 2015/0234460 A1 | 8/2015 | Irie et al. |
| 2016/0292519 A1 | 10/2016 | Templeton et al. |
| 2017/0186291 A1 | 6/2017 | Wenus et al. |
| 2018/0276480 A1* | 9/2018 | Peterson ............ G06K 9/00771 |

OTHER PUBLICATIONS

Islam et al. "Video Based Moving Object Tracking by Particle Filter." In: International Journal of Signal Processing, image processing and Pattern. Mar. 2009 (Mar. 2009) from <https://www.researchgate.net/profile/Md_Zahldul_Islam4/publication/45825493_Video_Based_Moving_Object_Tracking_by_Particle_Filter/links/55d96b1008aed6a199a8a8af.pdf> 15 pages.

\* cited by examiner

METHOD AND SYSTEM FOR RECOGNIZING USER ACTIONS WITH RESPECT TO OBJECTS

CROSS REFERENCE TO RELATED APPLICATION

The present application is based on and claims priority to Chinese Patent Application No. 201811533006.X, filed on Dec. 14, 2018, which is incorporated herein by reference in its entirety.

TECHNICAL FIELD

The specification relates to the field of the Internet of Things and smart retail technologies, and in particular, to a method and system for user action determination in retail scenarios.

BACKGROUND

In an offline retail scenario, by recognizing an action of a customer flipping or moving items in a store, the items that the customer is interested in can be determined. This information is significantly beneficial for the merchant to take advantage of, for example, by purchasing and stocking up popular items to optimize the supply chain, and optimizing the store layout.

In the era of the Internet of Things, image processing technologies and radio frequency identification (RFID) technologies have been gradually applied in the retail field. However, applications of image processing technologies and RFID technologies in the retail field are currently limited to individual simple scenarios. For example, image processing technologies are mostly applied for video monitoring, while the applications of RFID technologies are limited to code scanning for inventory check.

SUMMARY

In view of this, the specification provides a method and system for user action determination to solve or at least mitigate the above problems.

According to one aspect of the specification, a computer-implemented method for user action determination comprises: recognizing an item displacement action performed by a user; determining a first time and a first location of the item displacement action; recognizing a target item in a non-stationary state; determining a second time when the target item is in the non-stationary state and a second location where the target item is in the non-stationary state; and in response to determining that the first time matches the second time and the first location matches the second location, determining that the item displacement action of the user is performed with respect to the target item.

In some embodiments, the item displacement action performed by the user comprises flipping one or more items, moving one or more items, or picking up one or more items.

In some embodiments, recognizing the item displacement action performed by the user comprises: obtaining a video recording the item displacement action of the user; cropping the video to obtain a video of hands including images of the user's hands; inputting the video of hands into a classification model; and obtaining from the classification model a determination regarding whether the user has performed the item displacement action.

In some embodiments, the video of hands comprises a video of a left hand and a video of a right hand, and cropping the video to obtain a video of hands including images of the user's hands comprises: determining coordinates of left and right wrists of the user respectively in a plurality of image frames in the video; cropping each of the plurality of image frames to obtain a left hand image and a right hand image according to the coordinates of the left and right wrists of the user, respectively; combining a plurality of left hand images obtained from the plurality of image frames to obtain a left hand video; and combining a plurality of right hand images obtained from the plurality of image frames to obtain a right hand video.

In some embodiments, determining coordinates of left and right wrists of the user respectively in a plurality of image frames in the video comprises: using a human posture detection algorithm to determine the coordinates of the left and right wrists of the user in one of the plurality of image frames in the video; determine a first enclosing rectangle of the user; using a target tracking algorithm to determine a second enclosing rectangle of the user in a next one of the plurality of image frames in the video based on the first enclosing rectangle of the user; and using the human posture detection algorithm to determine the coordinates of the left and right wrists of the user in the next one of the plurality of image frames in the video based on the left and right wrists in the second enclosing rectangle of the user.

In some embodiments, the method may further comprise: in response to a determination from the classification model that the user has performed the item displacement action, determining an average of the coordinates of the left or right wrist of the user in the plurality of image frames in the video, and determining whether the average of the coordinates is within a target area; and in response to determining that the average of the coordinates is not within the target area, determining that the user had not performed the item displacement action.

In some embodiments, the target area includes a shelf area in a shop, and the target item includes a shelved merchandise.

In some embodiments, the classification model is training with samples comprising a video of hands of users performing item displacement actions and a video of hands of users not performing item displacement actions.

In some embodiments, the classification model includes a 3D convolution model.

In some embodiments, determining a first time and a first location of the item displacement action comprises: determining the first time and the first location of the item displacement action according to the video recording the item displacement action of the user.

In some embodiments, recognizing a target item in a non-stationary state comprises: receiving radio frequency (RF) signal sensed by an RF sensor from a radio frequency identification (RFID) tag attached to the target item; and in response to detecting fluctuation in the RF signal, determining the target item in the non-stationary state.

In some embodiments, the RF signal comprises a tag identifier, a signal strength, or a phase value.

In some embodiments, determining a second time when the target item is in a non-stationary state and a second location where the target item is in a non-stationary state comprises: determining the second time and the second location according to the RF signal sensed by the RF sensor.

According to another aspect of the specification, an apparatus for user action determination comprises one or more processors and one or more non-transitory computer-readable memories coupled to the one or more processors and configured with instructions executable by the one or more processors to cause the apparatus to perform operations comprising: recognizing an item displacement action performed by a user; determining a first time and a first location of the item displacement action; recognizing a target item in a non-stationary state; determining a second time when the target item is in the non-stationary state and a second location where the target item is in the non-stationary state; and in response to determining that the first time matches the second time and the first location matches the second location, determining that the item displacement action of the user is performed with respect to the target item.

According to still another aspect of the specification, a non-transitory computer-readable storage medium may be configured with instructions executable by one or more processors to cause the one or more processors to perform operations comprising: recognizing an item displacement action performed by a user; determining a first time and a first location of the item displacement action; recognizing a target item in a non-stationary state; determining a second time when the target item is in the non-stationary state and a second location where the target item is in the non-stationary state; and in response to determining that the first time matches the second time and the first location matches the second location, determining that the item displacement action of the user is performed with respect to the target item.

According to yet another aspect of the specification, a system is provided, comprising: an RFID tag, an RF sensor, a camera, and a computing device, wherein the RFID tag is provided on an item for uniquely identifying the item; the RF sensor is configured to receive a RF signal transmitted by the RFID tag and extract RFID tag information from the RFID tag; the camera is configured to collect a video recording an item displacement action performed by a user; and the computing device is in communication connection with the RF sensor and the camera, respectively, configured to obtain the RF signal and the video, and implement the above method for user action determination.

According to the specification, an action of a user with respect to an item, such as flipping or moving the item, can be automatically recognized, and thus the user's interest in the item can be determined, thereby providing a merchant with accurate user interest information that is significantly beneficial for the merchant to take advantage of, for example, by purchasing and stocking up popular items to optimize the supply chain, and optimizing the store layout.

By combining a video or image processing technologies and RFID technologies, the system according to the specification uses the video or image processing technologies to recognize an action of a user with respect to an item, such as flipping or moving the item, uses RFID technologies to identify an item that is in an non-stationary state, and combines the two results to determine which user performs an action (e.g., flipping or moving) with respect to which item. The system according to the specification not only can accurately recognize an item that a user is interested in, but also applies video or image processing technologies and RFID technologies in offline retail scenarios.

The description above is merely an overview of the specification. To make the specification clearer to understand for implementing the content of the specification, also to make the above and other objectives, features, and advantages of the specification easier to comprehend, embodiments of the specification will be provided below.

BRIEF DESCRIPTION OF THE DRAWINGS

To achieve the above and related objectives, some aspects of the specification will be described hereinafter with reference to the description and the accompanying drawings. These aspects indicate various embodiments where the principles disclosed hereinafter may be practiced, and all aspects and equivalent aspects thereof are intended to fall within the scope of the subject matters to be protected. Based on the detailed description below with reference to the accompanying drawings, the above and other objectives, features, and advantages of the specification will become clearer. Identical reference numerals in the drawings represent identical parts or elements throughout the specification.

DETAILED DESCRIPTION

Embodiments of the specification will be described in further detail below with reference to the accompanying drawings. Although the embodiments of the specification are illustrated in the accompanying drawings, the specification may be implemented in various ways without being limited by the embodiments elaborated hereinafter. The embodiments are provided for more thoroughly understanding of the specification, so that the scope of the specification can be conveyed to one of ordinary skill in the art.

Figure 1:
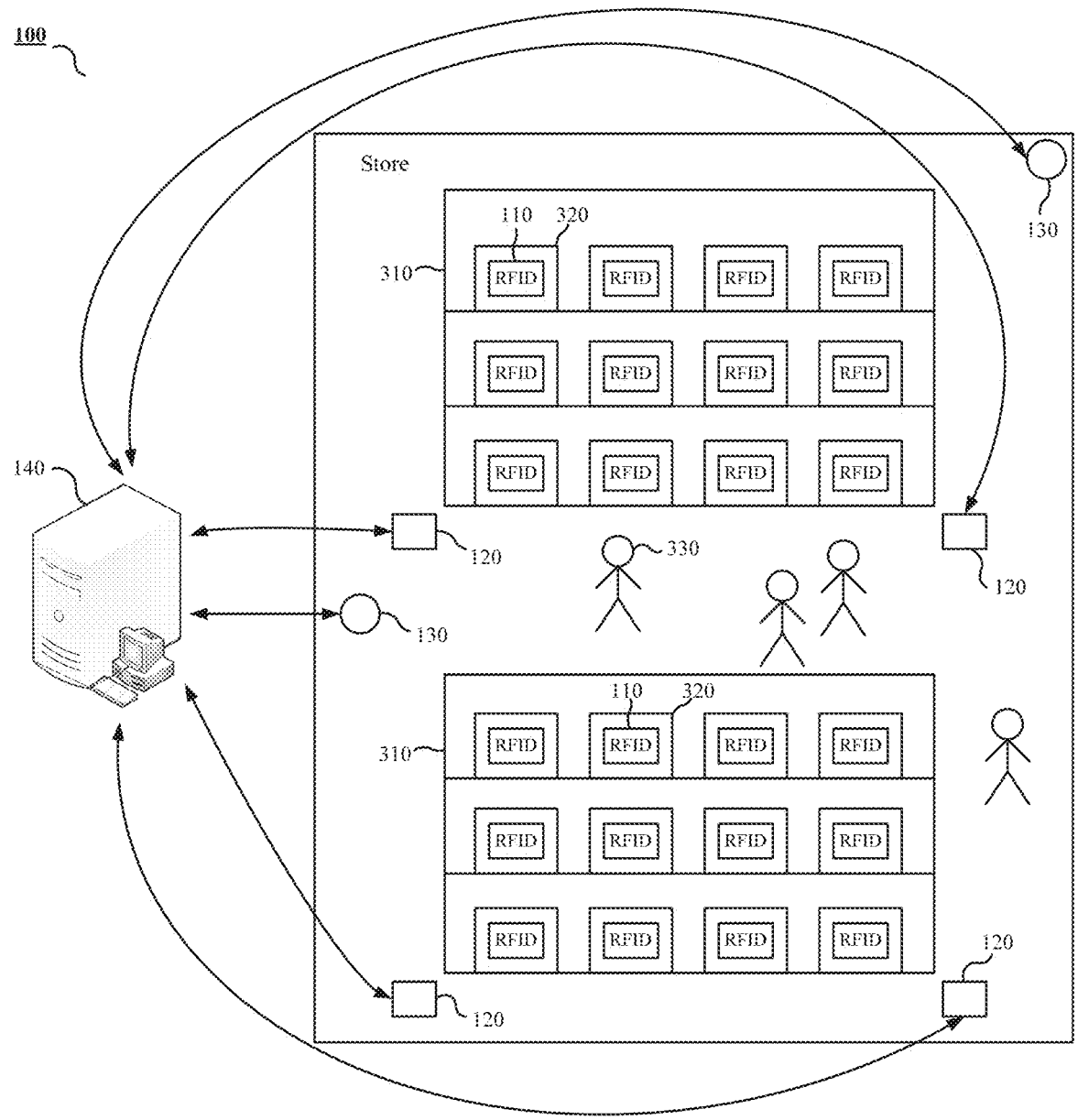
FIG. 1 is a schematic diagram of a system 100 for user action determination according to some embodiments of the specification.

FIG. 1 is a schematic diagram of a system 100 for user action determination according to some embodiments of the specification. The system 100 may be applied in an offline retail store, such as a supermarket, a specialty store of clothes, luggage, cosmetics, accessories, etc. As shown in FIG. 1, the system 100 comprises a Radio Frequency Identification (RFID) tag 110, a Radio Frequency (RF) sensor 120, a camera 130, and a computing device 140. The system 100 shown in FIG. 1 is only an example. Those skilled in the art should understand that, in a practical application, the system 100 may comprise any number of the RFID tag 110, the RF sensor 120, the camera 130, and the computing device 140, and the quantities of the RFID tag 110, the RF sensor 120, the camera 130, and the computing device 140 comprised in the system 100 are not limited in the specification.

As shown in FIG. 1, the offline retail store may comprise a plurality of shelves 310, and a plurality of items 320 (e.g., retail products) are placed on the shelves 310. A user 330 (e.g., a customer) walks and stops in the aisles of the store and selects the items 320 on the shelves 310. When the user 330 is interested in an item 320, the user may flip, move, pick, or displace the item 320, or examine the item 320 from all perspectives to obtain complete and detailed information regarding the item 320.

In some embodiment, the RFID tag 110 includes a coupling element and a chip. Each RFID tag 110 may have a unique identifier. In some embodiments, the RFID tag 110 is attached to an item 320 for uniquely identifying the item 320. In the retail store scenario, the item is a retail product in the store. In some embodiments, each of the items 320 in the store is attached with an RFID tag 110, and the RFID tag 110 is configured for uniquely identifying the item 320. The RFID tag 110 may be, for example, an low frequency (LF), high frequency (HF), or ultra-high frequency (UHF) tag, which is not limited thereto. The RFID tag 110 may also be, for example, an active or passive tag.

The RF sensor 120 is used to read (sometimes write) RFID tag information and thus obtain state information of the items 320 attached with the RFID tags 110. The sensing range of the RF sensor 120 is determined by such factors as power, antenna gain, and surroundings of the RF sensor 120, which may be a few meters (e.g., 2 to 3 meters). For example, the RF sensor 120 can sense information from an RFID tag 110 within a range of a few meters (e.g., 2 to 3 meters). In some embodiments, the RF sensor 120 is arranged close to the shelves 320. In some embodiments, to eliminate environmental interference and more accurately identify information of each RFID tag 110, at least two RF sensors 120 are arranged close to each shelf 320. For example, as shown in FIG. 1, one RF sensor 120 is equipped at each of the left and right sides of each shelf 320, respectively. The RF sensor 120 may be, for example, any RFID sensor capable of reading or writing RFID tag information, which is not limited thereto.

The RFID tag 110 and RF sensor 120 may operate as follows: the RF sensor 120 transmits an RF signal of a frequency through a transmission antenna, the RFID tag 110 disposed within the sensing range of the RF sensor 120 receives the RF signal and generates an induced current to obtain energy, so that the RFID tag 110 is activated to transmit its own identification information in another RF signal through a built-in RF antenna. A receiving antenna of the RF sensor 120 receives the RF signal from the RFID tag 110. The RF signal has two attributes, e.g., Received Signal Strength Indication (RSSI) and Phase. The RFID tag information can be extracted by demodulating and decoding the RF signal. When an item 320 remains still on the shelf, the RF signal from the RFID tag 110 of the item 320 sensed by the RF sensor 120 has little fluctuation and remains almost unchanged (e.g., the RSSI and phase of the RF signal are virtually unchanged). For example, when an item 320 is still on the shelf, the fluctuation of the RSSI or the phase of the RF signal is smaller than a threshold value. When the item 320 is in a non-stationary state, e.g., flipped, moved, picked up, or otherwise displaced by the user 330, the RFID tag 110 on the item 320 is also flipped, moved, picked up, or otherwise displaced, and thus the RF signal from the RFID tag 110 sensed by the RF sensor 120 changes correspondingly. For example, the fluctuation of the RF signal (or the RSSI and phase of the RF signal) is larger than a threshold value.

The camera 130 is configured for monitoring video recording, e.g., collecting videos of user actions inside the store. The camera 130 may be arranged high inside the store, e.g., on the store ceiling, to cover a wide field of view in the store.

The computing device 140 may be, for example, a stand-alone computer like a desktop computer, a laptop computer, etc., or may be a mobile device like a cell phone, a tablet computer, a multimedia device, a smart wearable device, and the like, or may be a server, which is not limited thereto. The computing device 140 may be provided locally in the store or may be provided at another geographic location different from the store as a remote server (e.g., a cloud server). The specification does not impose any limitation on the hardware configuration or deployment location of the computing device 140.

In some embodiments, the computing device 140 is in communication connection with the RF sensor 120 and the camera 130, respectively. The RF sensor 120 and the camera 130 may be connected to the computing device 140 in a wired manner, or may be connected to the computing device 140 in a wireless manner, such as 3G, 4G, WiFi, personal hotspot, IEEE802.11x, Bluetooth, and the like. The specification does not impose any limitation on the manner of connection between the RF sensor 120, the camera 130 and the computing device 140.

In some embodiments, the computing device 140 is configured to obtain the RF signal including the RFID tag information collected by the RF sensor 120, obtain the videos of user actions collected by the camera 130, and implement the method 200 for determining user actions with respect to items (e.g., item displacement actions performed by a user). According to the RF signal including the RFID tag information and videos of user actions, the computing device 140 recognizes the user actions and determines which user in the videos performs actions (also referred to as item displacement actions) with respect to which item.

Figure 2:
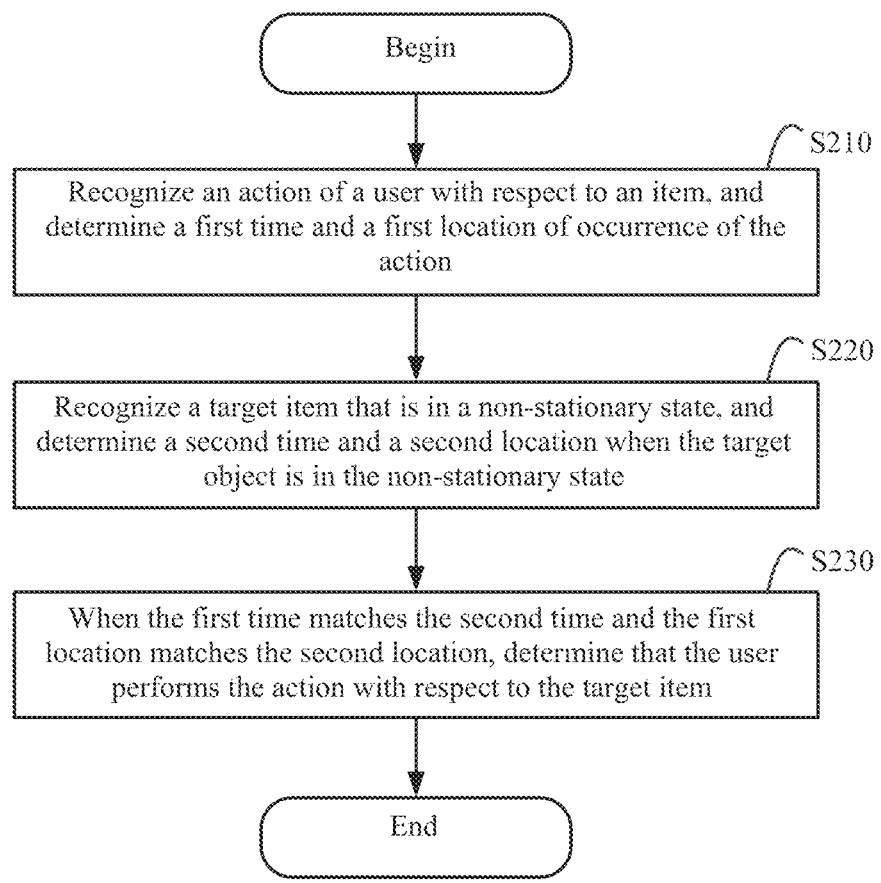
FIG. 2 is a flow chart of a method 200 for user action determination according to some embodiments of the specification.

FIG. 2 is a flow chart of a method 200 for user action determination according to some embodiments of the specification. The method 200 may be implemented in the computing device 140. As shown in FIG. 2, the method 200 may begin with a step S210.

In the step S210, an action of a user with respect to an item is recognized, and a first time and a first location of occurrence of the action are determined.

The action of a user with respect to an item (e.g., flipping, picking up, moving, or otherwise displacing of the item) may be referred to as item displacement action of the user. According to some embodiments, the action of a user with respect to an item (e.g., flipping, picking up, moving, or otherwise displacing of the item) may be recognized according to the following steps of S212-S216.

In the step S212, a video recording the action of the user is obtained. This video may be an original monitoring video collected by the camera 130. In some embodiments, subsequently, in the step S214, a video of hands including images of the user's hands may be obtained by cropping the video recording the action of the user.

In some embodiments, the video of hands comprises a video of a left hand and a video of a right hand, and correspondingly, the step S214 may be implemented using the method below: first, determining coordinates of the left and right wrists of the user in each image frames in the video of hands, respectively; then, cropping the each frame to obtain a left hand image and a right hand image according to the coordinates of the left and right wrists of the user, respectively; and lastly, combining a plurality of left hand images obtained by cropping a plurality of image frames in the video of hands to obtain the video of the left hand, and combining a plurality of right hand images obtained by cropping the plurality of image frames in the video of hands to obtain the video of the right hand.

The coordinates of the user's left and right wrists in each image frame may be determined by using a human posture detection algorithm. There are many types of human posture detection algorithms, such as DensePose, OpenPose, AlphaPose, and the like, which are not limited thereto. The human posture detection algorithms can recognize key points of a human body from an image or a video, thereby recognizing a human posture. In some human posture detection algorithms, left and right wrists are one of the recognized key points. For example, the human posture detection algorithms can recognize coordinates of left and right wrists. Left and right wrists are the central pivots of hand movements, and a circle with a wrist at the center can ensure the inclusion of a complete hand image. Therefore, an image of a user's hand can be determined according to the coordinates of left and right wrists of the user.

Figure 3A:
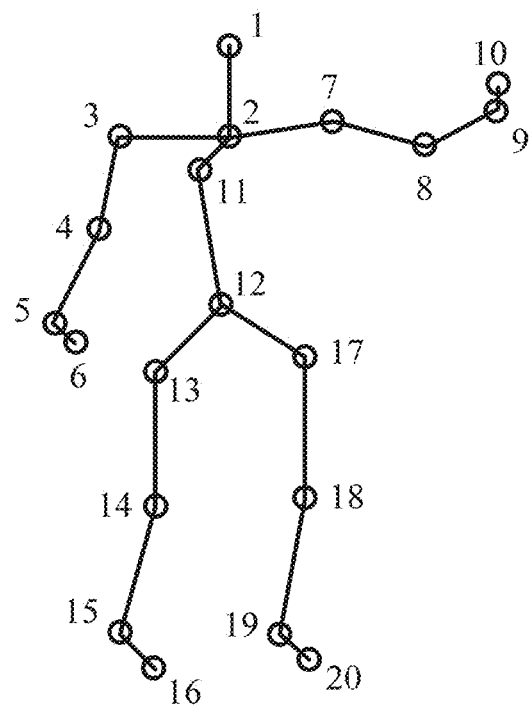
FIGS. 3A and 3B are schematic diagrams of key points of a human body according to some embodiments of the specification.

FIG. 3A is a schematic diagram of key points of a human body according to some embodiments of the specification. As shown in FIG. 3A, the human body comprises 20 key points. The correspondence relations between these 20 key points and human body parts may be as follows: 1—Head, 2—Shoulder Center, 3—Left Shoulder, 4—Left Elbow, 5—Left Wrist, 6—Left Hand, 7—Right Shoulder, 8—Right Elbow, 9—Right Wrist, 10—Right Hand, 11—Spine, 12—Hip Center, 13—Left Hip, 14—Left Knee, 15—Left Ankle, 16—Left Foot, 17—Right Hip, 18—Right Knee, 19—Right Ankle, and 20—Right Foot. In FIG. 3A, left and right hands are among the key points of the human body, respectively. The human posture detection algorithm can determine coordinates of left and right hands of the user in each image frame, thereby determining images of the user's hand. Additionally or alternatively, in FIG. 3A, left and right wrists may also be key points of the human body, and the human posture detection algorithm can also determine coordinates of left and right wrists of the user in each image frame, thereby determining images of the user's hand according to the coordinates of the wrists.

Figure 3B:
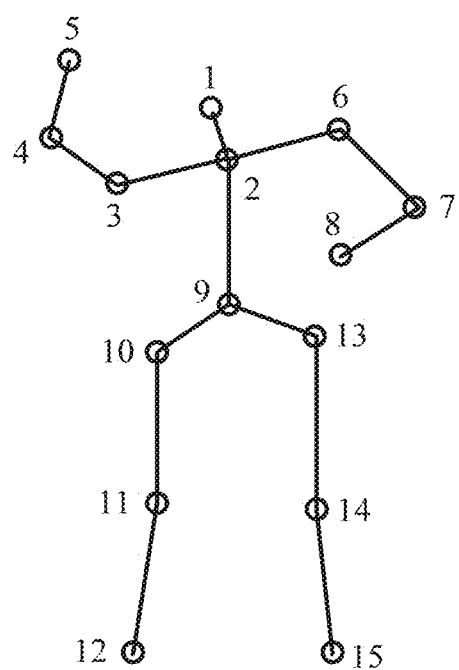

FIG. 3B is a schematic diagram of key points of a human body according to another embodiment of the specification. As shown in FIG. 3B, the human body comprises 15 key points. The correspondence relations between these 15 key points and human body parts may be as follows: 1—Head, 2—Shoulder Center, 3—Left Shoulder, 4—Left Elbow, 5—Left Wrist, 6—Right Shoulder, 7—Right Elbow, 8—Right Wrist, 9—Hip Center, 10—Left Hip, 11—Left Knee, 12—Left Foot, 13—Right Hip, 14—Right Knee, and 15—Right Foot. In FIG. 3B, left and right hands are not among the key points of the human body. Therefore, the human posture detection algorithm is unable to determine coordinates of left and right hands of the user in each image frame. Nevertheless, in FIG. 3B, left and right wrists are key points of the human body, and therefore, images of a user's hand may be determined according to the coordinates of left and right wrists of the user.

In some embodiments, the human posture detection algorithm can recognize coordinates of key points of each human body in an image, but it cannot ensure that the wrists in two consecutive images correspond to the same person. For example, in a process of a user performing actions (e.g., flipping, moving, picking up, etc.) with respect to items, the user's hands conduct operations like waving, extending into shelves, etc. along with body movements. However the user's wrists are often blocked from the camera view (e.g., by the shelves) and cannot be observed (e.g., by the camera 130). When the wrists leave the field of view and then re-enter the field of view, the user's action may be understood incorrectly if two different wrists are incorrectly associated with the same user. Therefore, when analyzing a user's action in a series of images, it is beneficial to ensure that the determined coordinates of the wrists in the images are associated with the same user.

According to some embodiments, a target tracking algorithm may be used to ensure that the wrists in a plurality of images correspond to the same user. The target tracking algorithm may be, for example, Kernel Correlation Filter (KCF) algorithm and the like, but is not limited thereto. After the target tracking algorithm is applied, the coordinates of left and right wrists of the user in all frames of image in a video of the user's actions may be determined according to the following steps: first, using a human posture detection algorithm to determine coordinates of left and right wrists of the user in an image frame in the video of the user's actions, and determine a first enclosing rectangle (also referred to as minimum bounding rectangle or box) of the user; then, using a target tracking algorithm to determine a second enclosing rectangle of the user in the next image frame in the video of the user's actions based on the first enclosing rectangle, and using the human posture detection algorithm to determine coordinates of the left and right wrists of the user in the next image frame by treating the wrists inside the second enclosing rectangle as the wrists of the user, thereby ensuring that the wrists correspond to the same user.

Figure 4:
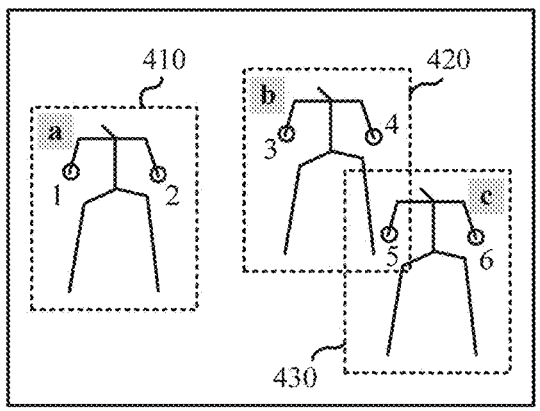
FIG. 4 is a schematic diagram of using a human posture detection algorithm and a target tracking algorithm to determine coordinates of a user's wrists according to some embodiments of the specification.
Figure 4:
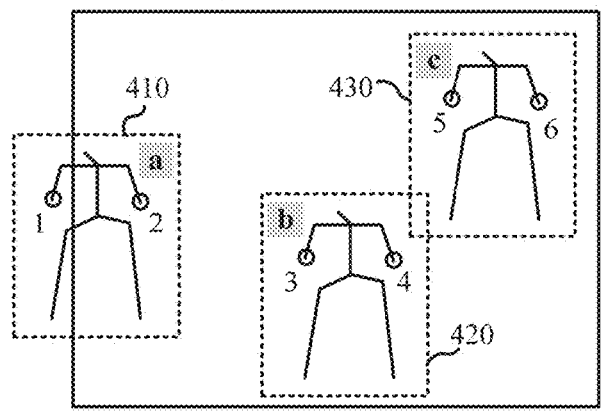
Figure 4:
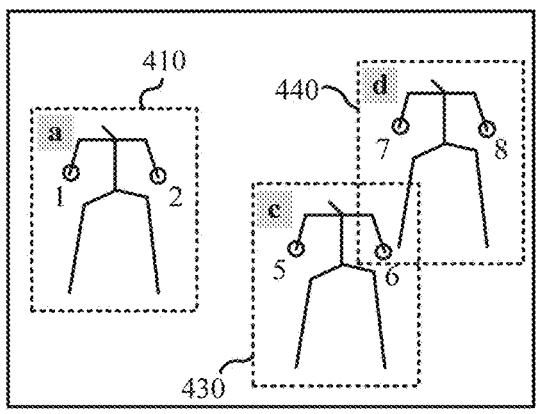
Figure 4:
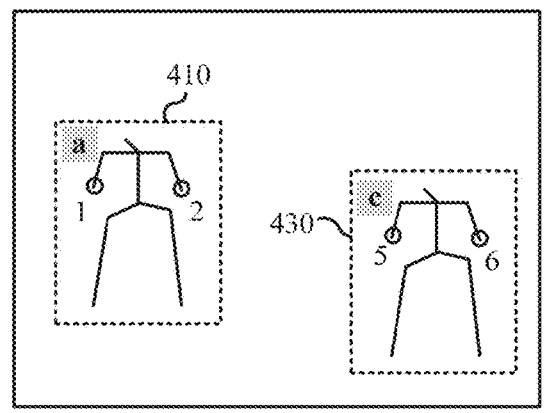

FIG. 4 is a schematic diagram of using a human posture detection algorithm and a target tracking algorithm to determine coordinates of a user's wrists according to some embodiments of the specification. As shown in FIG. 4, in a first frame, the human posture detection algorithm is used to recognize coordinates of key points of the human body of a user, and coordinates of the left and right wrists of the user can be determined based on the coordinates of key points of the human body of the user. Moreover, enclosing rectangles of multiple users may be determined, respectively, based on the coordinates of key points of the human bodies of the multiple users. In the first image frame, the enclosing rectangles and coordinates of left and right wrists of three users a, b, and c are determined by recognizing key points of the human bodies of the three users a, b, and c. The enclosing rectangles of the three users a, b, and c are labeled as 410, 420, and 430, respectively. Each wrist is assigned an independent number. The left and right wrists of the user a are numbered 1 and 2, respectively. The left and right wrists of the user b are numbered 3 and 4, respectively. The left and right wrists of the user c are numbered 5 and 6, respectively.

The target tracking algorithm may be applied to analyze image features inside the enclosing rectangle of each user in an image frame, and according to the image features, determine the location of the user in the next image frame, e.g., determining the enclosing rectangle of the user in the next image frame. Referring to FIG. 4, by using the target tracking algorithm, the locations of the users a, b, and c can be determined in the second image frame, as shown by rectangles 410, 420, and 430. Thus, the wrists in the rectangles 410, 420, and 430 correspond to the users a, b, and c, respectively. By executing the human posture detection algorithm again, coordinates of the left and right wrists of all the three users in the second image frame can be determined. For example, the wrist 2 in the rectangle 410 corresponds to the user a, the wrists 3 and 4 in the rectangle 420 correspond to the user b, and the wrists 5 and 6 in the rectangle 430 correspond to the user c. Therefore, in the second image frame, the left wrist 1 of the user a has left the field of view of the camera.

Subsequently, the target tracking algorithm is used to determine locations of the users a, b, and c in a third frame. As shown in FIG. 4, in the third image frame, the user b has disappeared, and the locations of the users a and c can be represented by the rectangles 410 and 430. By executing the human posture detection algorithm again, coordinates of the left and right wrists of all the two users in the third image frame can be determined. For example, the wrists 1 and 2 in the rectangle 410 correspond to the user a, and the wrists 5 and 6 in the rectangle 430 correspond to the user c.

Then, the target tracking algorithm may be used to determine locations of the users a and c in a fourth image frame, as shown by the rectangles 410 and 430 in the fourth image frame in FIG. 4. By executing the human posture detection algorithm again, coordinates of the left and right wrists of all the two users in the fourth frame can be determined. For example, the wrists 1 and 2 in the rectangle 410 correspond to the user a, and the wrists 5 and 6 in the rectangle 430 correspond to the user c. In addition, by using the human posture detection algorithm, new key points of human bodies of users other than the users a and c can be detected in the fourth frame. These new key points may be assigned a user number d, and left and right wrists of the user d are assigned new numbers 7 and 8, and an enclosing rectangle 440 of the user d is determined according to the key points of the user d.

After the coordinates of left and right wrists of the users in each image frame are determined, left hand images (also referred to as images of left hand) and right hand images (also referred to as images of right hand) of the users may be obtained by cropping the each image frame. The cropping rules and sizes of the obtained left hand images and right hand images may be set according to practical applications, which are not limited by the specification. In some embodiments, an obtained left (or right) hand image may be a rectangular image with the coordinates of left (or right) hand as the center of the image and with the length and width being preset values.

After the left hand images and right hand images are obtained, a plurality of left hand images obtained from the cropping may be combined to obtain a left hand video (also referred to as a video of the left hand) of the user; and a plurality of right hand images obtained from the cropping may be combined to obtain a right hand video (also referred to as a video of the right hand) of the user. For example, as shown in FIG. 4, wrists having the same number are combined into a hand video. The left hand video of the user a includes partial images of the wrist 1 obtained by cropping the first frame, the third frame, and the fourth frame, and the right hand video of the user a includes partial images of the wrist 2 obtained by cropping the first frame through the fourth frame.

Subsequently, in the step S216, the video of hands is inputted into a classification model, so that the classification model outputs a determination regarding whether the user conducted an action (e.g., flipping, moving, picking up, or otherwise displacing, etc.) with respect to an item.

In some embodiments, the video of hands comprises a left hand video (also referred to as a video of a left hand) and a right hand video (also referred to as a video of a right hand). In the step S216, the left hand video and the right hand video of the user are inputted into a classification model, respectively. The classification model may output a determination regarding whether the left hand and the right hand of the user has performed the action of flipping, moving, and the like, with respect to an item, respectively. As long as the determination in at least one of the two outputs is yes, it indicates that the user has performed the action of flipping, moving, and the like, with respect to an item.

In some embodiments, the classification model is obtained through training based on training samples. For example, the training samples may include the videos of hands of users who are performing the actions of flipping, moving, and the like, with respect to an item and the videos of hands of users who are not performing the actions of flipping, moving, and the like, with respect to an item. The videos of hands of users who are performing the actions of flipping, moving, and the like, with respect to an item may be referred to as positive samples (a corresponding classification tag may be "yes"), and the videos of hands of users who are not performing the actions of flipping, moving, and the like, with respect to an item may be referred to as negative samples (a corresponding classification tag may be "no"). The classification model may be, for example, a 3D convolution model, which is not limited thereto.

According to some embodiments, if in the step S216, the classification model outputs a determination that the user has conducted the action of flipping, moving, and the like, with respect to an item, then an average of the coordinates of the wrist (e.g., left or right wrist) of the user that has conducted the action of flipping, moving, and the like, with respect to the item in all the image frames may be calculated, and whether the average of the coordinates is within a preset target area is determined; and if the average of the coordinates is not within the target area, it is determined that the user has not conducted the action of flipping, moving, and the like, with respect to an item. In the offline retail scenario, the target area may be the shelf area. When the user has conducted the action of flipping, moving, and the like in the shelf area, it indicates that the object with respect to which the user has conducted the action of flipping, moving, and the like may be items on the shelves (e.g., products, goods); and when the user has conducted the action of flipping, moving, and the like in a non-shelf area (e.g., an aisle), it indicates that the object with respect to which the user has conducted the action of flipping, moving, and the like may not be items on the shelves (e.g., products, goods), but may be other articles, such as a personal article carried by the user. This method can be used to eliminate the actions of users with respect to articles other than items on the shelves (e.g., products, goods), thereby accurately recognizing users' actions of flipping, moving, and the like, with respect to items on shelves.

To determine whether the average of wrist coordinates is within the preset target area, coordinates of the target area may be determined first. In the retail scenario, the target area may be the shelf area, and the non-target area may be an isle area. Since various kinds of items are placed in the shelf area, the information thereof, such as color, boundary, and the like, is more complicated than that of the isle area. Therefore, morphology image processing methods, such as corrosion, swelling, and the like, can be used to distinguish the shelf area from the isle area. In addition to the morphology image processing methods, such as corrosion, swelling, and the like, those skilled in the art may also use other image processing methods to recognize the target area. In some embodiments, a manual labeling method may also be used to determine the target area, and the specification does not impose any limitation on the method for determining the target area.

After an action of the user with respect to an item is recognized by following the steps S212-S216, a time (referred to as a first time) and a location (referred to as a first location) of occurrence of the action may be determined. When recording a video, the camera 130 can display a recording time, and correspondingly, the time when the user conducted the action of flipping, moving, and the like with respect to an item can be determined according to the recording time of the video. In addition, the camera 130 may be arranged at a fixed position in the store. Therefore, the coordinates of the items in the images collected by the camera 130 may have a fixed correspondence relation with actual coordinates of the items in the store, and the first location where the user conducted the action of flipping, moving, and the like with respect to the item can be determined according to coordinate in the video of the user's actions.

In step S220, a target item that is in a non-stationary state is recognized, and a time (referred to as a second time) when the target item is in the non-stationary state and a location (referred to as a second location) where the target item is in the non-stationary state are determined. For example, a non-stationary state of an item may indicate that the item is flipped, moved, picked, displaced, etc., by a user.

The steps S210 and S220 are sequentially executed in the flow chart shown in FIG. 2, but there is no strict order between the steps S210 and S220. For example, the step S210 may be executed first to recognize an action of a user with respect to an item, and then the step S220 may be executed to recognize a target item that is in a non-stationary state, as shown in FIG. 2; alternatively, the step S220 may be executed first to recognize a target item that is in a non-stationary state, and then the step S210 may be executed to recognize an action of a user with respect to an item. In some embodiments, the steps S210 and S220 may also be executed in parallel to save computing time and improve the computing efficiency.

According to some embodiments, the following method may be used to recognize a target item that is in a non-stationary state: first, receiving RF signals including RFID tag information sensed by an RF sensor 120 from multiple RFID tags 110, as shown in FIG. 1, wherein an RFID tag 110 is arranged on an item 320 and used to uniquely identify the item 320; and subsequently, determining an item 320 associated with fluctuated RF signal as the target item. In other embodiments, a target item that is in a non-stationary state may be recognized as follows: receiving RF tag information sensed by an RF sensor 120 from an RFID tag 110, wherein the RFID tag 110 is attached on an item 320 and configured to uniquely identify the item 320; and in response to determining that the received RF signal is fluctuated, determining the item 320 as the target item.

Referring back to FIG. 1, when the items 320 remains still on the shelf, the RF signal from the RFID tags 110 of the items sensed by the RF sensor 120 has little fluctuation and remains almost unchanged (e.g., the RSSI and phase of the RF signal are virtually unchanged). For example, when an item 320 is still on the shelf, the fluctuation of the RSSI or the phase of the RF signal is smaller than a threshold value. When the items 320 is flipped, moved, or the like, by the user 330, the RFID tags 110 on the items are also consequently flipped, moved, or the like. Therefore, the RF signals from the RFID tags 110 sensed by the RF sensor 120 change correspondingly. Therefore, a target item may be determined according to the fluctuation of RF signal sensed by the RF sensor 120.

According to some embodiments, the RFID tag information comprises a tag identifier, a signal strength, and a phase value. When the fluctuation of signal strength and phase sensed by the RF sensor 120 exceeds a preset threshold, it indicates that the item corresponding to the RFID tag 110 transmitting the fluctuated RF signal is in a non-stationary state. For example, at the moment t1, the RF sensor 120 senses that the RF signal with an RFID tag id1 has a signal strength of rssi1 and a phase of $\alpha 1$; and at the moment t2, the RF sensor 120 senses that the RF signal with the RFID tag id1 has a signal strength of rssi2 and a phase of $\alpha 2$. If the absolute value of the difference between signal strength rssi1 and rssi2 is greater than a first threshold and/or the absolute value of the difference between phases $\alpha 1$ and $\alpha 2$ is greater than a second threshold, the item corresponding to the RFID tag id1 is marked as the target item.

Those skilled in the art should understand that, in addition to the above threshold determination methods, other detection algorithms such as exception detection algorithms may also be used to detect RF signal that experiences fluctuation, to determine whether an item is in a non-stationary state. The exception detection algorithms may include, for example, outlier detection algorithms such as the Grubbs algorithm, the Extreme Studentized Deviate (ESD) algorithm, etc., which is not limited thereto.

In some embodiments, if only one RF sensor 120 is used to sense RF signals from RFID tags 110, misdetection of the states of the items 320 may occur due to environmental interference. For example, two or more RF sensors may be used to sense RF signals from RFID tags 110 to avoid misdetection. In some embodiments, when the fluctuation range of RF signal associated with an item 320 sensed by all the RF sensors 120 exceeds a preset threshold, the item may be determined to be a target item, thereby eliminating environmental interference and improving the accuracy and robustness of the RFID tag information based item state determination.

After the target item in a non-stationary state is recognized, a second time when the target item is in the non-stationary state and a second location where the target item is in the non-stationary state may be determined. When sensing an RF signal including RFID tag information, the RF sensor 120 records the time of sensing the RF signal including the RFID tag information, and correspondingly, the second time when the target item is in the non-stationary state can be determined according to the recorded time of sensing the RF signal including the RFID tag information. In addition, in the offline retail scenario, each RFID tag 110 corresponds to one item 320, and the position of the items on a shelf may be fixed. Even when the items is flipped, moved, or the like, by a customer, the items are still located close to the fixed original position. Therefore, each RFID tag 110 corresponds to a fixed position in the store, and the second location corresponding to an RFID tag 110 can be determined according to the tag identifier sensed by the RF sensor 120.

Subsequently, in step S230, when the first time matches the second time and the first location matches the second location, it is determined that the user performs the action with respect to the target item.

In some embodiments, it may be rare for the first time to be exactly the same as the second time and/or the first location to be exactly the same as the second location due to the presence of system errors at the time of data collection and calculation errors in the process of data analysis. Therefore, the "matching" in the step S230 may not require that the two time are exactly the same or the two locations (e.g., represented by coordinates) are exactly the same, but may refer to that the two values are substantially close to each other and can therefore be considered as approximately the same. For example, the absolute value of the difference between the first time and the second time and the absolute value of the difference between the first location and the second location may be smaller than a preset threshold to indicate the first time matches the second time and the first location matches the second location.

Figure 5:
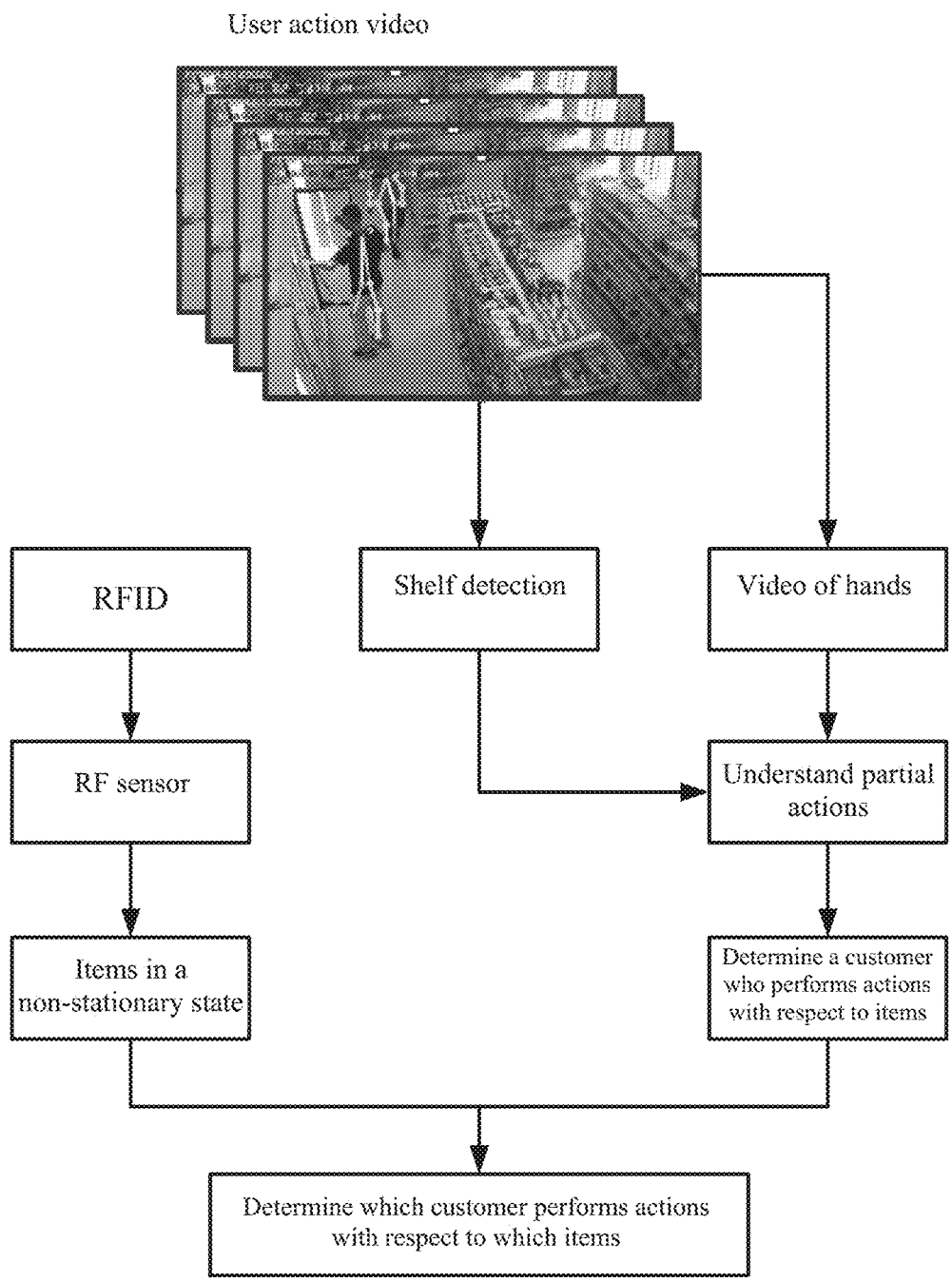
FIG. 5 is a schematic diagram of a user action determination process according to some embodiments of the specification.
Figure 6:
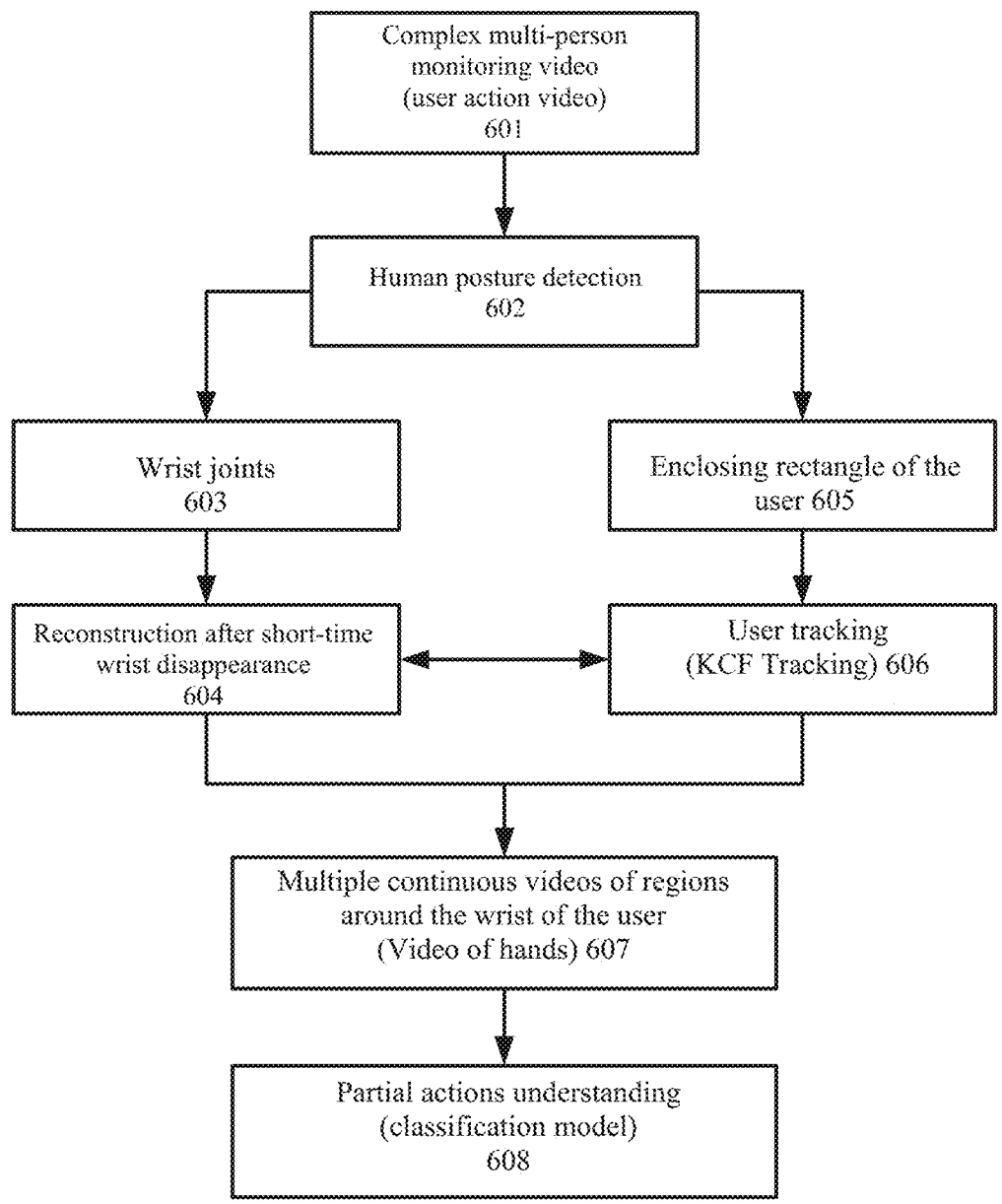
FIG. 6 is a schematic diagram of a process of cropping a user action video to obtain a video of hands according to some embodiments of the specification.

To more clearly describe the solution for understanding user actions according to the specification, FIG. 5 is a schematic diagram of a user action determination process according to some embodiments of the specification. As shown in FIG. 5, the camera is provided in an offline store, and the original video collected by the camera is a user (customer) action video. The user action video may be cropped to obtain a video of hands of the user. The process of obtaining the video of hands from the user action video is shown in FIG. 6. FIG. 6 is a schematic diagram of a process of cropping a user action video to obtain a video of hands according to some embodiments of the specification. In FIG. 6, the user action video may be a complex multi-person monitoring video, as shown in block 601. As shown in FIG. 6, a human posture detection algorithm, may be used to determine coordinates of wrist joints of the user in all image frames in the video of hands, and an enclosing rectangle of the user may be determined, as shown in blocks 602, 603, 605. A target tracking algorithm (such as a KCF tracking algorithm) may be used to ensure that the wrists in a plurality of image frames are associated with the same user, as shown in block 606. Even when a wrist of the user is blocked from a field of view (e.g., by a shelf) and disappears temporarily from some image frames, the wrist can still be associated with previous image frames when the wrist re-enters the field of view, enabling wrist reconstruction after short-time disappearance, as shown in block 604 and ensuring that the wrists in different image frames correspond to the same user, thereby laying a foundation for accurately understanding actions of the user. The video of hands of the user can be obtained based on the human posture detection algorithm and the target tracking algorithm. Multiple continuous videos of regions around the wrist of the user may be obtained, as shown in block 607. The video of hands of the user is obtained and inputted into a classification model, as shown in block 608, and the classification model outputs a determination regarding whether the user performs an action (e.g., flipping, moving, and the like) with respect to the items. Therefore, based on multiple videos of hands of multiple user, the classification model can determine which users (e.g., customers) in the videos perform actions with respect to items on the shelves. In some embodiments, the method of shelf detection can be used to eliminate actions of users with respect to other articles (e.g., items not on the shelves), thereby accurately recognizing actions with respect to products or goods.

As shown in FIG. 5, in addition to determining customers who perform actions with respect to items according to the videos of users' actions, the items that are in a non-stationary state may also be determined through their RF signals sensed by the RF sensor.

After the customers who perform actions with respect to items and the items that are in a non-stationary state are determined, which customer in the video performs an action with respect to which item can be determined based on the time and location of the customer performing the action with respect to an item and the location and time of the item being in the non-stationary state.

In some embodiments, after it is determined which user (customer) performs an action with respect to which item (items), a method like face recognition may be further used to recognize the identity of the customer, use the items flipped, moved, or the like by the customer as items in which the customer is interested, thus determine the preference of the customer for items, and provide personalized services, such as recommendation of items, to the customer based on the preference of the customer for items.

Figure 7:
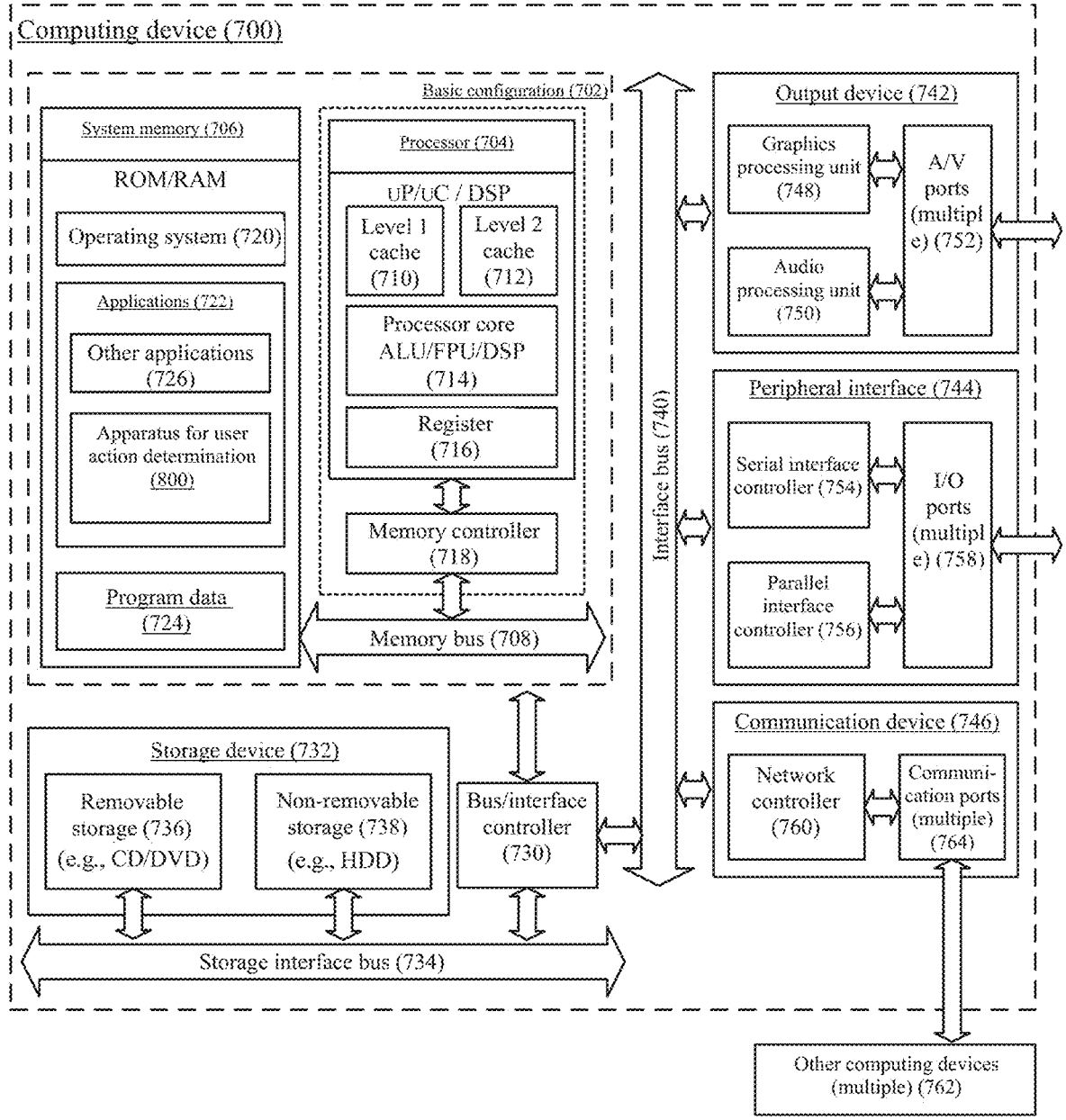
FIG. 7 is a schematic diagram of a computing device 700 for user action determination according to some embodiments of the specification.

FIG. 7 is a schematic diagram of a computing device 700 for user action determination according to some embodiments of the specification. As shown in FIG. 7, in the basic configuration 702, the computing device 700 may comprise a system memory 706 and one or more processors 704. A memory bus 708 may be used for communications between the processors 704 and the system memory 706. In some embodiments, the system memory 706 may be a non-transitory computer-readable storage medium configured with instructions executable by one or more processors 704 to cause the one or more processors 704 to perform the various steps or methods for user action determination.

In some embodiments, the processors 704 may be configured for any type of processing, including but not limited to: a micro-processor (µP), a micro-controller (µC), a digital signal processor (DSP), or any combination thereof. The processors 604 may include caches of one or more levels, such as the level 1 cache 710 and the level 2 cache 712, a processor core 714, and a register 716. Examples of the processor core 714 may include, but not be limited to, an arithmetic logic unit (ALU), a floating-point unit (FPU), a digital signal processing core (DSP core), or any combination thereof. In some embodiments, a memory controller 718 may be used together with the processors 704, or in some embodiments, the memory controller 718 may be an internal part of the processors 704.

In some embodiments, the system memory 706 may be any type of memories, including but not limited to: a volatile memory (e.g., RAM), a non-volatile memory (e.g., ROM, flash memory, etc.), or any combination thereof. The system memory 706 may comprise an operating system 720, one or more applications 722, and program data 724. The applications 722 may be a plurality of program instructions that are configured to instruct the processors 704 to execute corresponding operations (e.g., the operations in the method 200). In some embodiments, the applications 722 may be provided in the operating system to cause the processors 704 to execute operations by using the program data 724.

The computing device 700 may further comprise an interface bus 740 that facilitates communications from various interface devices (e.g., an output device 742, a peripheral interface 744, and a communication device 746) to the basic configuration 702 via the bus/interface controller 730. In some embodiments, the output device 742 includes a graphics processing unit 748 and an audio processing unit 750, which may be configured to facilitate communications with various peripheral devices, such as displays or speakers, via one or more A/V ports 752. In some embodiments, the peripheral interface 744 may include a serial interface controller 754 and a parallel interface controller 756, which may be configured to facilitate communications with peripheral devices, such as input devices (e.g., a keyboard, a mouse, a pen, a voice input device, and a touch input device) or other peripheral devices (e.g., a printer, a scanner, etc.) via one or more I/O ports 758. In some embodiments, the communication device 746 may include a network controller 760, which may be configured to facilitate communications with one or more other computing devices 762 through a network communication link via one or more communication ports 764.

The network communication link may be an example of communication media. The communication media may be embodied by computer readable instructions, a data structure, or a program module in a modulated data signal such as a carrier or other transmission mechanisms, and may include any information transfer medium. The "modulated data signal" may be such signal that one or more of data sets thereof or variations thereof may be performed in a manner of encoding information in the signal. As a nonlimiting example, the communication media may include a wired medium, such as a wired network or a dedicated network, as well as various wireless media, such as voice, RF, microwave, infrared wave (IR), or other wireless media. The term "computer readable medium" herein may include both storage media and communication media.

In the computing device 700 according to the specification, the applications 722 may, for example, comprise a supply chain optimization apparatus 800. The apparatus 800 comprises a plurality of program instructions capable of instructing the processors 704 to execute the method 200 of the specification for determining a user action with respect to an item. The computing device 700 may be implemented as a local computer or server, which is not limited thereto.

Figure 8:
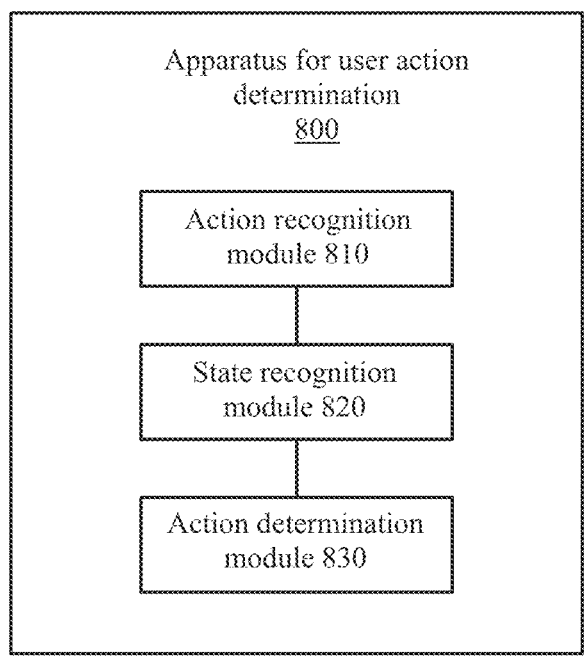
FIG. 8 is a schematic diagram of an apparatus 800 for user action determination according to some embodiments of the specification.

FIG. 8 is a schematic diagram of an apparatus 800 for user action determination according to some embodiments of the specification. The apparatus 800 may reside in a computing device (such as the above computing device 140) for executing the method 200 of the specification for determining a user action with respect to an item. As shown in FIG. 8, the apparatus 800 for user action determination comprises an action recognition module 810, a state recognition module 820, and an action determination module 830. In some embodiments, the various modules of the apparatus 800 in FIG. 8 may be implemented as software instructions. In other embodiments, the apparatus for user action determination may comprise a processor and a non-transitory computer-readable storage medium storing the instructions that, when executed by the processor, cause one or more components of apparatus 800 to perform various steps and methods of the modules described hereinafter.

The action recognition module 810 is configured to recognize an action of a user with respect to an item, and determine a first time and a first location of occurrence of the action. For example, the action recognition module 810 is configured to execute the method as set forth in the step S210. Reference may be made to relevant description of the step 5210 for processing logics and functions of the action recognition module 810, which will not be elaborated herein.

The state recognition module 820 is configured to recognize a target item that is in a non-stationary state, and determine a second time when the target item is the non-stationary state and a second location where the target item is the non-stationary state. For example, the state recognition module 820 is configured to execute the method as set forth in the step S220. Reference may be made to relevant description of the step S220 for processing logics and functions of the state recognition module 820, which will not be elaborated herein.

The action determination module 830 is configured to determine, when the first time matches the second time and the first location matches the second location, that the user performs the action with respect to the target item. For example, the action determination module 830 is configured to execute the method as set forth in the step S230. Reference may be made to relevant description of the step 5230 for processing logics and functions of the action determination module 830, which will not be elaborated herein.

Various technologies described herein may be implemented with reference to hardware, software, or a combination thereof. Therefore, the method, apparatus, and device of the specification or some aspects or parts of the method, apparatus, and device of the specification may be in a form of a program code (i.e., the instructions) in an embedded tangible medium, such as a mobile hard drive, a USB flash drive, a floppy disk, a CD-ROM, or any other machine-readable storage media, wherein, when the program is loaded into a machine such as a computer and is executed by the machine, the machine becomes a device that practices the specification.

In the case where the program code is executed in a programmable computing device the computing device generally comprises a processor, a processor-readable storage medium (including volatile and non-volatile memories and/or storage elements), at least one input apparatus, and at least one output apparatus, wherein the memory is configured to store the program code, and the processor is configured to execute the data storage method and/or data query method of the specification according to instructions in the program code stored in the memory.

In an example but not a limiting manner, the readable medium includes both readable storage media and communication media. A readable storage medium stores information such as a computer readable instruction, a data structure, a program module, or other data. A communication medium may embody computer readable instructions, a data structure, a program module or other data with a modulated data signal such as a carrier or other transmission mechanisms, and includes any information transfer medium. Moreover, any combination thereof is also encompassed by the range of readable media.

In the specification herein, the algorithms and displays are not inherently related to any particular computer, virtual system, or other devices. Various general systems may also be used together with examples of the specification. It would be clear to one of ordinary skill in the art to construct a structure required by this type of systems according to the description above. In addition, the specification is not limited to any particular programming language. It should be understood that various programming languages may be used to implement the content of the specification described herein, and the above description of a particular language is for disclosing a preferred implementation manner of the specification.

Details have been described in the specification herein. However, it should be understood that the embodiments of the specification may be practiced without these details. In some embodiments, known methods, structures, and technologies are not described in detail so as not to make it difficult to understand the specification.

Similarly, it should be understood that, to simplify the specification and help understand one or more aspects of the specification, the features of the specification are sometimes grouped together into individual embodiments, figures, or description thereof in the above description of embodiments of the specification. However, the method of the specification may not be interpreted as having the following intention, i.e., the specification to be protected requires more features than the features stated in the claims. Moreover, as reflected by the claims below, the invention aspects have fewer features than all features of individual embodiments disclosed above. Therefore, the claims following an implementation manner are incorporated into the implementation manner, wherein each claim itself acts as an individual embodiment of the specification.

Those skilled in the art should understand that modules, units, or components of the devices in the examples disclosed herein may be provided in the devices as set forth in the embodiments, or may be alternatively positioned in one or more devices different from the devices in the examples. The modules in the examples may be combined into one module. Additionally, they may be divided into a plurality of sub-modules.

Those skilled in the art should understand that modules in the devices in the embodiments may be adaptively modified and provided in one or more devices different from the embodiments. The modules, units, or components in the embodiments may be combined into one module, unit, or component. Additionally, they may be divided into a plurality of sub-modules, sub-units, or sub-components. Except that at least some of these features and/or processes or units that are mutually exclusive, any combination may be used to combine all features disclosed in the specification (including the accompanying claims, abstract, and drawings), as well as all processes or units of any method or device so disclosed. Unless otherwise stated, each feature disclosed in the specification (including the accompanying claims, abstract, and drawings) may be replaced by an alternative feature with the identical, equivalent or similar objective.

In addition, those skilled in the art should understand that, although some embodiments described herein comprise some features rather than other features comprised in other embodiments, a combination of features of different embodiments means that the combination falls within the scope of the specification and a different embodiment is formed. For example, in the appended claims, any one of the embodiments to be protected may be used in any combination.

In addition, some of the embodiments are described herein as combinations of methods or method elements that can be implemented by a processor of a computer system or other apparatuses that execute the functions. Therefore, a processor having instructions necessary for implementing the methods or method elements forms an apparatus for implementing the methods or method elements. In addition, elements of the apparatus embodiment described herein are examples of the following apparatus: the apparatus is configured to implement functions that are executed by elements for achieving the objectives of the specification.

As used herein, the use of ordinal numbers "first," "second," "third," and the like to describe ordinary items means that different examples of similar items are involved, and does not intend to imply that the items described in such a manner must have a given order in time, space, sequence or any other manner, unless otherwise stipulated.

Although the specification is described according to a limited number of embodiments, those skilled in the art should understand, given the description above, that other embodiments may be conceived of within the scope of the specification described herein. In addition, it should be noted that the language used in this specification is selected mainly for the purpose of readability and teaching, rather than for explaining or defining the subject of the specification. Therefore, without departing from the scope and spirit of the appended claims, many amendments and variations are clear to those skilled in the art. With regard to the scope of the specification, the disclosure of the specification is illustrative rather than limiting, and the scope of the specification is defined by the appended claims.

What is claimed is:

1. A computer-implemented method for user action determination, comprising:
   recognizing an item displacement action performed by a user;
   determining a first time and a first location of the item displacement action;
   recognizing a target item in a non-stationary state;
   determining a second time when the target item is in the non-stationary state and a second location where the target item is in the non-stationary state; and
   in response to determining that the first time matches the second time and the first location matches the second location, determining that the item displacement action of the user is performed with respect to the target item.

2. The method according to claim 1, wherein the item displacement action performed by the user comprises flipping one or more items, moving one or more items, or picking up one or more items.

3. The method according to claim 1, wherein recognizing a target item in a non-stationary state comprises:
   receiving radio frequency (RF) signal sensed by an RF sensor from a radio frequency identification (RFID) tag attached to the target item; and
   in response to detecting fluctuation in the RF signal, determining the target item in the non-stationary state.

4. The method according to claim 3, wherein the RF signal comprises a tag identifier, a signal strength, or a phase value.

5. The method according to claim 3, wherein determining a second time when the target item is in a non-stationary state and a second location where the target item is in a non-stationary state comprises:
   determining the second time and the second location according to the RF signal sensed by the RF sensor.

6. The method according to claim 1, wherein recognizing the item displacement action performed by the user comprises:
   obtaining a video recording the item displacement action of the user;
   cropping the video to obtain a video of hands including images of the user's hands;
   inputting the video of hands into a classification model; and
   obtaining from the classification model a determination regarding whether the user has performed the item displacement action.

7. The method according to claim 6, wherein determining a first time and a first location of the item displacement action comprises:
   determining the first time and the first location of the item displacement action according to the video recording the item displacement action of the user.

8. The method according to claim 6, wherein the classification model is training with samples comprising a video of hands of users performing item displacement actions and a video of hands of users not performing item displacement actions.

9. The method according to claim 8, wherein the classification model includes a 3D convolution model.

10. The method according to claim 6, wherein the video of hands comprises a video of a left hand and a video of a right hand, and cropping the video to obtain a video of hands including images of the user's hands comprises:

determining coordinates of left and right wrists of the user respectively in a plurality of image frames in the video;

cropping each of the plurality of image frames to obtain a left hand image and a right hand image according to the coordinates of the left and right wrists of the user, respectively;

combining a plurality of left hand images obtained from the plurality of image frames to obtain a left hand video; and combining a plurality of right hand images obtained from the plurality of image frames to obtain a right hand video.

11. The method according to claim 10, wherein determining coordinates of left and right wrists of the user respectively in a plurality of image frames in the video comprises:

using a human posture detection algorithm to determine the coordinates of the left and right wrists of the user in one of the plurality of image frames in the video;

determine a first enclosing rectangle of the user;

using a target tracking algorithm to determine a second enclosing rectangle of the user in a next one of the plurality of image frames in the video based on the first enclosing rectangle of the user; and using the human posture detection algorithm to determine the coordinates of the left and right wrists of the user in the next one of the plurality of image frames in the video based on the left and right wrists in the second enclosing rectangle of the user.

12. The method according to claim 10, further comprising:

in response to a determination from the classification model that the user has performed the item displacement action, determining an average of the coordinates of the left or right wrist of the user in the plurality of image frames in the video, and determining whether the average of the coordinates is within a target area; and in response to determining that the average of the coordinates is not within the target area, determining that the user had not performed the item displacement action.

13. The method according to claim 12, wherein the target area includes a shelf area in a shop, and the target item includes a shelved merchandise.

14. An apparatus for user action determination, comprising one or more processors and one or more non-transitory computer-readable memories coupled to the one or more processors and configured with instructions executable by the one or more processors to cause the apparatus to perform operations comprising:

recognizing an item displacement action performed by a user;

determining a first time and a first location of the item displacement action;

recognizing a target item in a non-stationary state;

determining a second time when the target item is in the non-stationary state and a second location where the target item is in the non-stationary state; and in response to determining that the first time matches the second time and the first location matches the second location, determining that the item displacement action of the user is performed with respect to the target item.

15. The apparatus according to claim 14, wherein the item displacement action performed by the user comprises flipping one or more items, moving one or more items, or picking up one or more items.

16. The apparatus according to claim 14, wherein recognizing the item displacement action performed by the user comprises:

obtaining a video recording the item displacement action of the user;

cropping the video to obtain a video of hands including images of the user's hands;

inputting the video of hands into a classification model; and obtaining from the classification model a determination regarding whether the user has performed the item displacement action.

17. The apparatus according to claim 16, wherein the video of hands comprises a video of a left hand and a video of a right hand, and cropping the video to obtain a video of hands including images of the user's hands comprises:

determining coordinates of left and right wrists of the user respectively in a plurality of image frames in the video;

cropping each of the plurality of image frames to obtain a left hand image and a right hand image according to the coordinates of the left and right wrists of the user, respectively;

combining a plurality of left hand images obtained from the plurality of image frames to obtain a left hand video; and combining a plurality of right hand images obtained from the plurality of image frames to obtain a right hand video.

18. The apparatus according to claim 17, wherein determining coordinates of left and right wrists of the user respectively in a plurality of image frames in the video comprises:

using a human posture detection algorithm to determine the coordinates of the left and right wrists of the user in one of the plurality of image frames in the video;

determine a first enclosing rectangle of the user;

using a target tracking algorithm to determine a second enclosing rectangle of the user in a next one of the plurality of image frames in the video based on the first enclosing rectangle of the user; and using the human posture detection algorithm to determine the coordinates of the left and right wrists of the user in the next one of the plurality of image frames in the video based on the left and right wrists in the second enclosing rectangle of the user.

19. The apparatus according to claim 17, wherein the operations further comprise:

in response to a determination from the classification model that the user has performed the item displacement action, determining an average of the coordinates of the left or right wrist of the user in the plurality of image frames in the video, and determining whether the average of the coordinates is within a target area; and in response to determining that the average of the coordinates is not within the target area, determining that the user had not performed the item displacement action.

20. A non-transitory computer-readable storage medium configured with instructions executable by one or more processors to cause the one or more processors to perform operations comprising:

recognizing an item displacement action performed by a user;

determining a first time and a first location of the item displacement action;

recognizing a target item in a non-stationary state;

determining a second time when the target item is in the non-stationary state and a second location where the target item is in the non-stationary state; and in response to determining that the first time matches the second time and the first location matches the second location, determining that the item displacement action of the user is performed with respect to the target item.

\* \* \* \* \*